Patented July 2, 1940

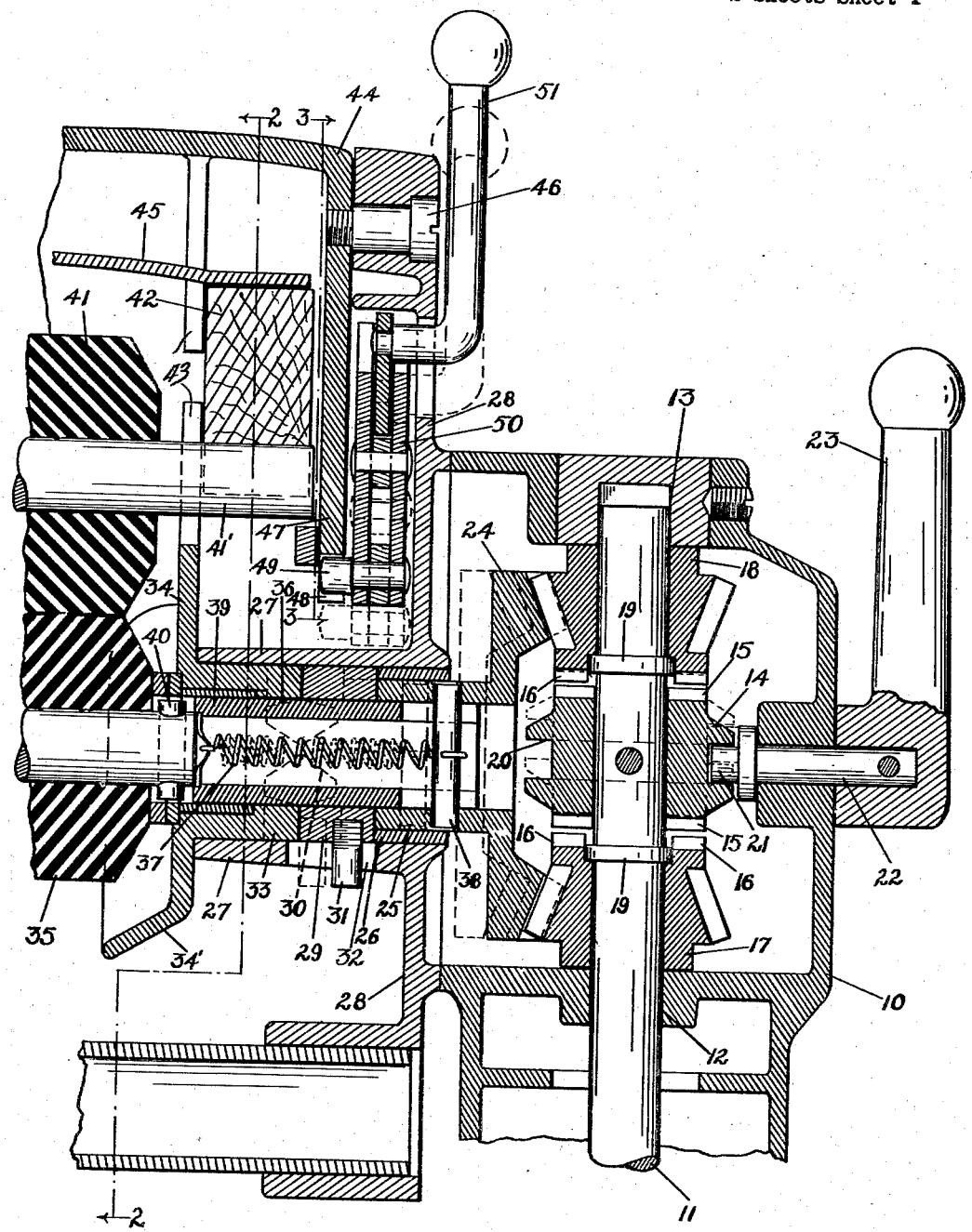
Fig-1-

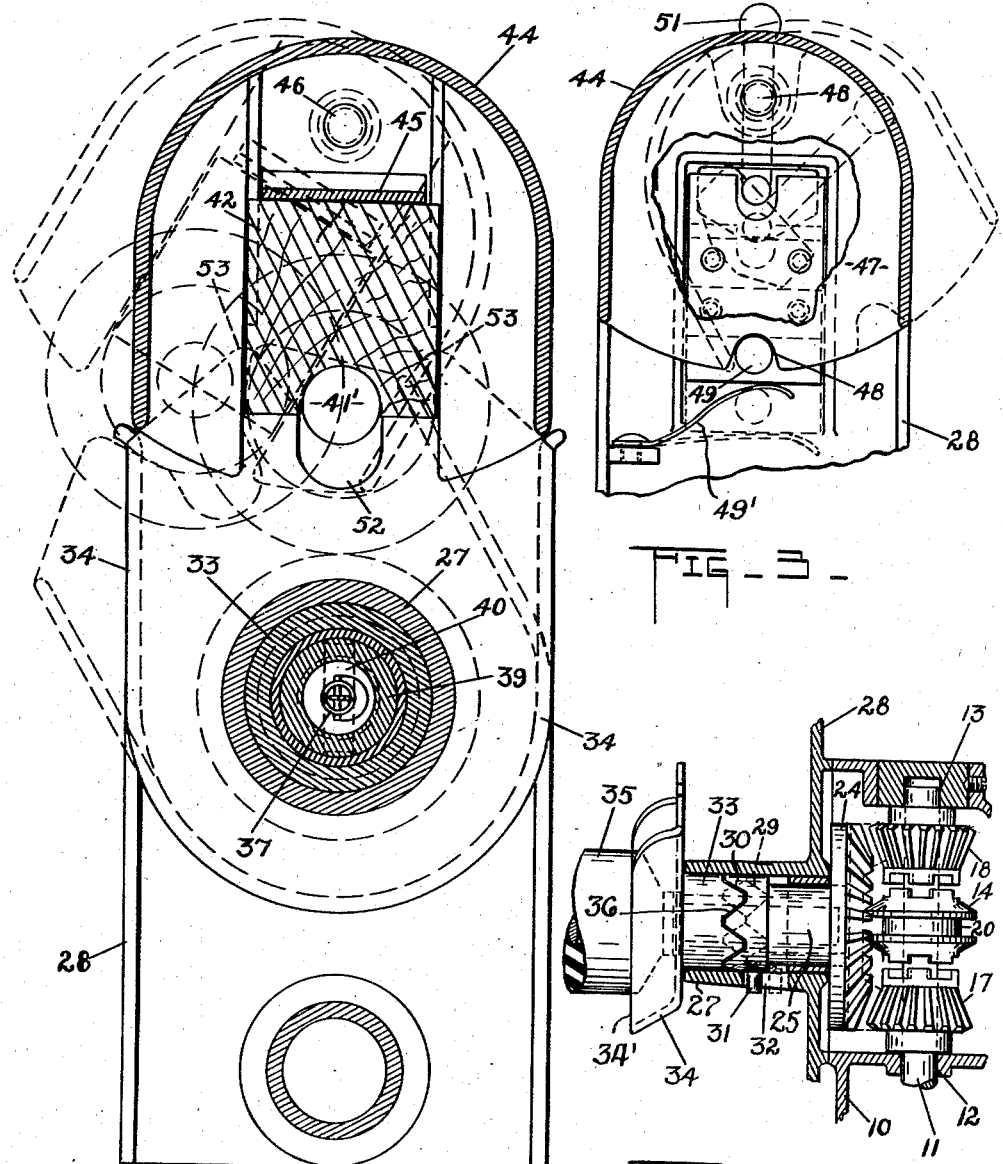

2,206,301

UNITED STATES PATENT OFFICE 2,206,301

ROLL STOP MECHANISM

Vernon E. Dunn, Fairfield, Iowa

Application June 3, 1936, Serial No. 83,289

6 Claims. (Cl. 68—253)

This invention is directed to the art of making roll stop mechanism for wringers and has for its principal object to provide a roll stop mechanism which operates in a novel manner to disengage the power connection to the rolls when the latter are operated to relieve pressure between them. Another object is to provide a roll stop mechanism including a gear to be moved out of mesh with the roll driving gears to stop the rolls, in which the movement of the gear is accomplished by means of a cam rotatable about the axis of the gear, said cam being actuated by movement of the roll pressure mechanism.

Other and additional objects will appear in the following description and accompanying drawings in which:

Fig. 1 is a fragmental, sectional, side elevational view showing the driving end of a wringer, embodying my invention;

Fig. 2 is a sectional end elevational view taken on line 2—2 in Fig. 1;

Fig. 3 is a sectional end elevational view taken on line 3—3 in Fig. 1; and

Fig. 4 is a fragmental, sectional, side elevational view showing parts to be described.

Fig. 1 illustrates a somewhat conventional wringer head mechanism consisting of a housing structure 10 which is assumed to be properly supported from a washing machine or other structure.

A driven shaft 11 is journalled in bearings 12 and 13 in the housing structure and carries a keyed, sliding clutch member 14 which has teeth 15 that are engageable with teeth 16 formed on the inner ends of bevel gears 17 and 18 which latter are rotatably mounted on shaft 11 and are confined thereon between bearings 12 and 13 and collars 19.

The clutch body has an annular groove 20 which engages a stud 21 carried eccentrically upon a shaft 22, mounted for rotation in housing 10. A handle 23 is secured to the outer end of shaft 22 whereby the shaft is rotated to cause movement of clutch 14 into or out of engagement with either of gears 17 or 18 in the obvious manner.

Meshing with gears 18 is a gear 24 having a hollow hub 25 which is rotatably mounted in bushings 26 affixed in a hollow boss portion 27 of the wringer frame structure 28.

Next the hub 25, and within the boss 27 is a ring member 29 having cam faces 30. A pin 31 is affixed in one side of the ring and is confined in a slot 32 in the lower wall of boss 27. The ring is made slidable in the boss 27 and is obviously prevented from rotating therein by means of the pin 31.

Next the ring 31 is an extending boss portion 33 of a structure 34 which has a flared flange portion 34' partly surrounding and guarding the end of a lower wringer roll 35 and extending upwardly as will be described. The inner end of boss portion 33, opposite cam faces 30, is provided with cam faces 36 similar to faces 30.

It will be noted that the cam faces are arranged to fit together in a manner similar to meshing teeth of a gear as shown in Fig. 4. This arrangement corresponds to one position of structure 34 with gear 24 positioned out of mesh with bevel pinions 17 and 18, whereas when structure 34 is rotated to the position shown in dotted lines in Fig. 2, which movement obviously rotates the cams 36 with respect to cams 30, the ring 29 is caused to move toward the right to place gear 24 in mesh with gears 17 and 18.

Gear 24, with ring 29, is normally urged toward unmeshed position by a spring 37 which is anchored upon a pin 38 affixed in the hub of the gear and is attached at its opposite end to a part fixed at the opposite end of a tubular shaft 39.

The tubular shaft is made rotatable within the boss 33 and ring 29. It extends within the hub of gear 24 and in this end it is slotted so as to engage the pin 38 in slidable relation. At the opposite end the shaft is slotted to engage a pin 40 affixed in the shaft of the lower wringer roll 35.

It will now become apparent that the gear 24 has direct driving connection with roll 35 through the hollow shaft 39. It has already been explained that gear 24 is movable into or out of mesh with gears 17 and 18 and in the manner noted the roll is obviously to be driven from shaft 11 through the clutch 14 in direction according to the position of clutch 14 with respect to the gears 17 and 18.

As above explained the spring 37 urges the gear 24 out of meshed position and thus when member 34 is rotated to the position shown in dotted lines in Fig. 2, with cams 30 and 36 in meshed relation, the gear 24 is disengaged and the roll 35 remains stationary. Upon movement of member 34 into the solid line position, cams 36 are rotated whereby cams 30, with ring 29 and gear 24 are forced toward the right, Fig. 1, and gear 24 is placed in mesh as described.

For the purpose of illustration I show a particular top roll frame structure having operable connection with the above described mechanism.

However, it is to be understood that the particular top frame structure shown is not a necessary part of the invention. It will be obvious that many other forms of top frame may be modified so as to actuate the drive control mechanism without alteration of the drive control mechanism itself.

In the drawings I show the end of a top roll 41 with its shaft 41' journalled in a bearing block 42.

The bearing block is mounted to slide in a channel formed by ribs 43 on the inner side of the wall of the top frame structure 44. It is assumed that roll 41 is similarly journalled at the opposite end of the top frame.

A conventional roll pressure spring 45 is supported in the top frame 44 with its ends resting upon bearing blocks 42 in such a manner as to press the upper roll upon the lower roll for the well-known purpose.

The top frame is pivotally supported on the head structure 28 by means of a stud 46 secured in the end walls of the top frame. The end wall 47 extends downwardly and has a slot 48 engaged by a stud 49 which is carried upon a member 50 mounted in head structure 28 in such a manner that it may be moved vertically by means of an attached manually accessible handle 51. Dotted lines in Fig. 1 indicate that handle 51 may be depressed so as to force the member 50 downwardly against the tension of the leaf spring 49' and move the stud 49 downwardly out of slot 48 to leave the top frame 44 free to rock upon stud 46, as will be described.

As shown in Figs. 1 and 2 the upper part of the flange portion of member 34 extends upwardly on each side of the roll shaft 41', there being a notch 52 at the center with inclined camlike surfaces declining from peaks 53 toward the notch as shown.

In practical use the device operates as follows:

With the top frame and shaft 41' aligned as shown in Fig. 2 and locked as described by the stud 49, the upper roll is held in working position upon the lower roll by the spring 45 and the gear 24 is held in mesh with gears 17 and 18. The parts are thus arranged for practical operation as a wringer. Due to the offset position of the pivot 46 with respect to the contact point between rolls 41 and 35, together with the downward pressure of spring 45 there is a tendency for roll 41 to swing out of alignment with roll 35, as indicated in dotted lines in Fig. 2. The latter described movement is normally prevented by the stud 49 engaged in slot 48 as described.

With the wringer in operation, in case it is desired to quickly release the tension between the rolls, it is but necessary to depress the handle 51 whereby the top frame is left free to rock to one side in accordance with the direction of rotation of the lower roll, the tendency being for the upper roll to ride the lower roll outwardly and away from the intake side of the wringer.

During the movement just described, the shaft 41', being engaged between peaks 53, obviously causes member 34 to rock, as shown and described, whereby the gear 34 is removed from driving engagement with gears 17 and 18, thus stopping the rolls simultaneously with release of pressure between them.

To rearrange the mechanism into working position the top frame is rocked back to bring the rolls into proper alignment whereupon the holding stud 49 is replaced in slot 48 to lock the frame in position. During the resetting movement, the member 34 is automatically operated to place gear 24 in meshed position as described.

The foregoing has described my invention. Modifications of structure are obviously possible without alteration of the principle involved. I do not wish to be limited in structure or function except within the scope of the appended claims.

What I claim is:

1. In a wringer mechanism including a manually reversible wringer head, the combination of a lower frame, a top frame mounted for movement transversely of the frame about a fixed pivot on said lower frame, a roll member carried by the upper frame, a roll member in the lower frame, a drive mechanism, clutching mechanism connecting the lower roll with the drive mechanism and means operating said clutch consisting of a cam rotative about the axis of the lower roll, connection enabling the cam to operate the clutch and connection between the cam and top frame whereby movement of the top frame brings about rotative movement of the cam to operate the clutch.

2. In a wringer mechanism including a manually reversible wringer head, the combination of a lower frame, a top frame pivotally mounted for transverse movement with respect to said lower frame and having a slot, rolls in the frames, a depressible member mounted on said lower frame cooperating with said slot in the top frame to maintain said rolls in normal operative position, a clutch mechanism controlling rotation of the rolls, a cam mechanism actuating said clutch, said cam mechanism being rotatable about the axis of the lower roll and capable by means of said rotation of actuating the clutch and connection between the top frame and cam mechanism whereby movement of the top frame brings about rotation of the cam mechanism to actuate the clutch.

3. In a wringer mechanism including a manually reversible wringer head, the combination of a lower frame mounted on said head, a top frame movable transversely of said lower frame and having a slot, rolls in the frames, pressure mechanism for the rolls, exerting pressure from the top frame, means for holding the top frame in pressure applying position comprising a depressible member mounted in said lower frame having a pin cooperating with the slot in said top frame whereby movement of the top frame to release pressure on the rolls is permitted when said member and pin are in depressed position, drive means for the rolls, a clutch controlling rotation of the wringer rolls, a cam mechanism actuating the clutch, said cam mechanism being rotatable about the axis of the lower roll to actuate the clutch and a forked lever connection between the cam mechanism and top frame whereby release movement of the top frame brings about rotation of the cam to operate the clutch.

4. In a wringer mechanism including a manually reversible wringer head, the combination of a lower frame mounted on said head, a roll mounted for rotation therein, a driving mechanism for the lower roll, a clutch operable to connect or disconnect the driving mechanism from the roll, an upper roll, a top frame carrying the upper roll, said top frame being pivotally mounted for transverse movement with respect to said lower frame to place the upper roll in or out of working position with respect to the lower roll, means for maintaining said top frame in non-rocking position including a pin and slot connection between said top frame and said lower frame, a cam mechanism rotatable about the axis of the lower roll capable of actuating said clutch to start or stop the lower roll and forked lever mechanism connecting the top frame and cam mechanism in such a manner that rocking movement of the top frame causes rotative movement of the cam mechanism whereby when the top frame is rocked to place the upper roll out of working position said clutch is actuated to disconnect the driving mechanism from the lower roll.

5. In a wringer, a pair of pressure rolls, a main frame, a top frame, a pivotal connection between the top frame and the main frame to permit transverse swinging movement of the top frame in either direction from a single center operating position toward either of two released positions on opposite sides of the center operating position, a manually releasable latch to interlock said top and main frames and maintain the top frame in said center operating position; power means to drive the wringer rolls comprising a bevel gear assembly including a pair of twin bevel driving pinions in spaced relationship on a common driving shaft and positioned in inverted relationship to each other, and a single common driven bevel gear positioned between said twin pinions and coupled to the wringer rolls; and a selective gear operating mechanism to alternatively establish power driving connection between either of said twin pinions and the driven gear; a roll stop mechanism including a crank arm and a loading spring to urge said power means toward a disengaged position, and means responsive to the actuation of the frame release latch to actuate said roll stop mechanism.

6. In a wringer, a main frame and a driven lower wringer roll journaled for rotation in said frame; a swinging top frame including a pivotal connection between the top frame and the main frame to permit transverse swinging movement of the top frame in either direction from an operating position on the center line of the main wringer frame toward released positions on either side of said center line, a manually releasable latch to interlock said top and main frames and maintain said top in center operating position, an upper wringer roll adapted to engage the lower roll in pressure relationship when the top frame is in center position, and to move into spaced relationship with the lower roll when said top frame assumes a released position, power driving means for said lower roll comprising a bevel gear assembly having a driving shaft, a forward bevel driving pinion and a reverse bevel driving pinion on said driving shaft, the said pinions being of similar configuration and positioned in inverted relationship to each other, said driving pinions being arranged to come into meshing engagement with a common bevel driven gear coupled to the lower roll to drive said gear and roll in a forward or reverse direction, and a manually operable reversing handle to selectively shift said gear assembly into forward, neutral, or reverse driving positions, and roll stop means responsive to the release of the aforementioned latch to disengage the power mechanism from the wringer rolls.

VERNON E. DUNN.